United States Patent
Nomura et al.

(10) Patent No.: US 7,619,695 B2
(45) Date of Patent: Nov. 17, 2009

(54) LIQUID CRYSTAL DISPLAY AND MANUFACTURING METHOD THEREFOR

(75) Inventors: Shinichiro Nomura, Tottori (JP); Takayuki Kato, Tottori (JP); Takao Atarashiya, Tottori (JP); Hiroki Sugiyama, Tottori (JP); Satoshi Morita, Tottori (JP)

(73) Assignee: Epson Imaging Devices Corporation, Azumino-shi, Nagano (JP)

( * ) Notice: Subject to any disclaimer, the term of this patent is extended or adjusted under 35 U.S.C. 154(b) by 177 days.

(21) Appl. No.: 11/797,769

(22) Filed: May 7, 2007

(65) Prior Publication Data

US 2007/0263130 A1 Nov. 15, 2007

(30) Foreign Application Priority Data

| May 10, 2006 | (JP) | ............................ 2006-131082 |
| May 15, 2006 | (JP) | ............................ 2006-135658 |
| Mar. 13, 2007 | (JP) | ............................ 2007-062948 |

(51) Int. Cl.
G02F 1/1343 (2006.01)
(52) U.S. Cl. .................................. 349/38; 349/33
(58) Field of Classification Search .................. 349/33, 349/36–38; 537/E21.535; 438/30; 385/2, 385/27, 37, 129
See application file for complete search history.

(56) References Cited

U.S. PATENT DOCUMENTS

| 2003/0038306 A1* | 2/2003 | Izumi et al. .................. 257/222 |
| 2004/0114059 A1 | 6/2004 | Lee et al. |
| 2004/0141100 A1* | 7/2004 | Tsubata et al. ................. 349/44 |
| 2005/0092992 A1* | 5/2005 | Nagata et al. .................. 257/59 |
| 2005/0285987 A1* | 12/2005 | Azumada et al. .............. 349/43 |
| 2006/0009108 A1* | 1/2006 | Shigeno ....................... 445/24 |
| 2006/0267969 A1* | 11/2006 | Doi et al. ..................... 345/204 |
| 2007/0146566 A1* | 6/2007 | Hosoya .......................... 349/43 |
| 2008/0198108 A1* | 8/2008 | Aoki ........................... 345/87 |
| 2008/0254598 A1* | 10/2008 | Yamazaki et al. ........... 438/473 |

FOREIGN PATENT DOCUMENTS

JP 4-261017 A 9/1992

(Continued)

*Primary Examiner*—Ellen Kim
(74) *Attorney, Agent, or Firm*—Westerman, Hattori, Daniels & Adrian, LLP

(57) ABSTRACT

A liquid crystal display 10 of the invention has a transparent substrate 11 on which are provided multiple signal lines 17, scan lines 16 and auxiliary capacity lines 18, plus TFTs and pixel electrodes 20 that are electrically coupled to the TFTs' drain electrodes D. The auxiliary capacity lines 18 are formed with an Al—Nd alloy layer coated with a layer of molybdenum. Each pixel region, except for the auxiliary capacity lower electrode 18a on the auxiliary capacity line 18, is coated over by a first insulating film 25 and by a second insulating film 26 that is thinner than the first insulating film 25. Further, the auxiliary capacity lower electrodes 18a are coated over by the second insulating film 26, and auxiliary capacity upper electrodes 18b are provided on the surface of the second insulating film 26 at the auxiliary capacity lower electrodes 18a. Thanks to such structure, a small-pixel-area or high-definition liquid crystal display, and manufacturing method therefor, can be provided whereby short circuits in the regions forming the auxiliary capacity are few, the auxiliary capacity is large, and display irregularities such as crosstalk or flicker are satisfactorily curbed.

3 Claims, 11 Drawing Sheets

FOREIGN PATENT DOCUMENTS

| | | |
|---|---|---|
| JP | 2584290 B2 | 2/1997 |
| JP | 2000-267595 A | 9/2000 |
| JP | 2001-13520 A | 1/2001 |
| JP | 2005-506575 A | 3/2005 |
| JP | 2005-309147 A | 11/2005 |
| WO | WO 03/036374 A1 | 5/2003 |

* cited by examiner

FIG.4
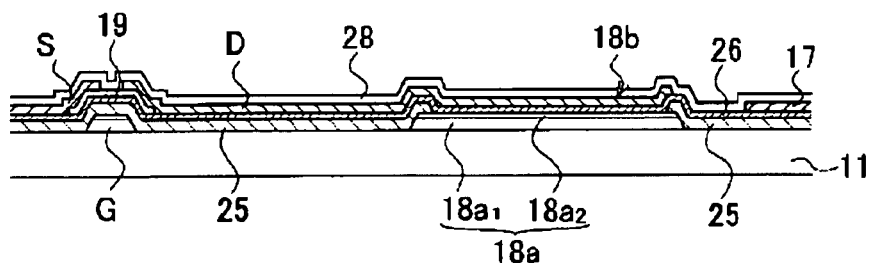
FIG. 4A
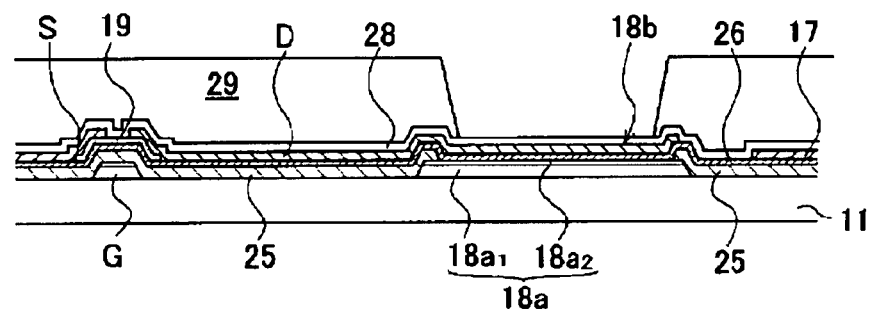
FIG. 4B
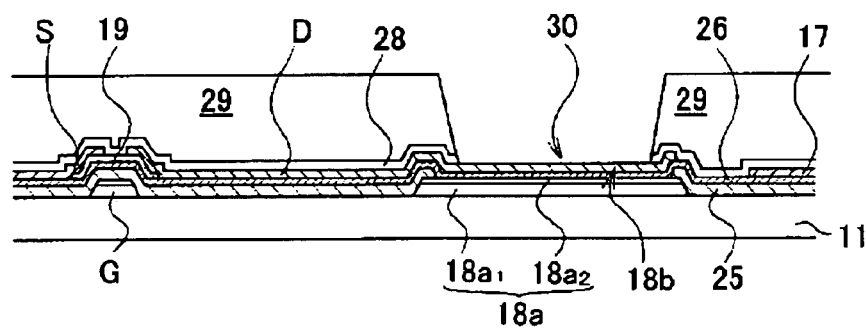
FIG. 4C
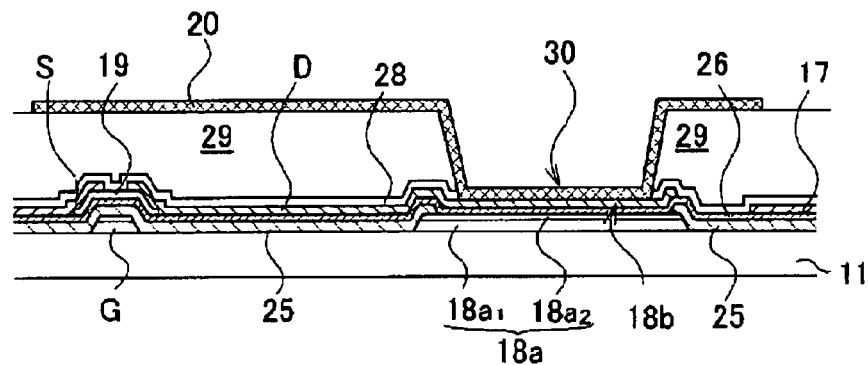
FIG. 4D

FIG.5
REACTIVE ION ETCHING
PLASMA ETCHING
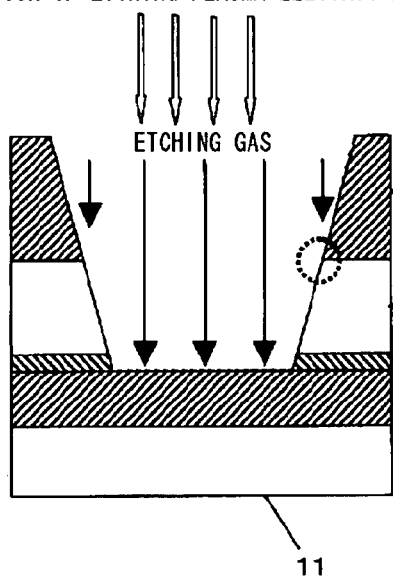
FIG. 5A
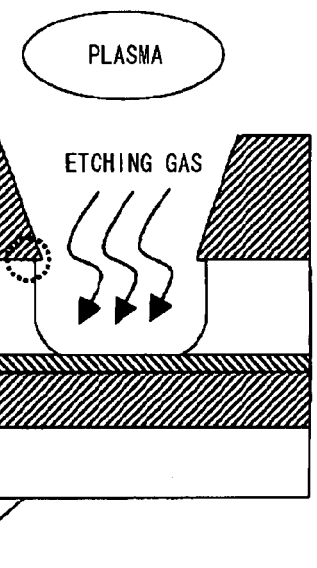
FIG. 5B

FIG.7
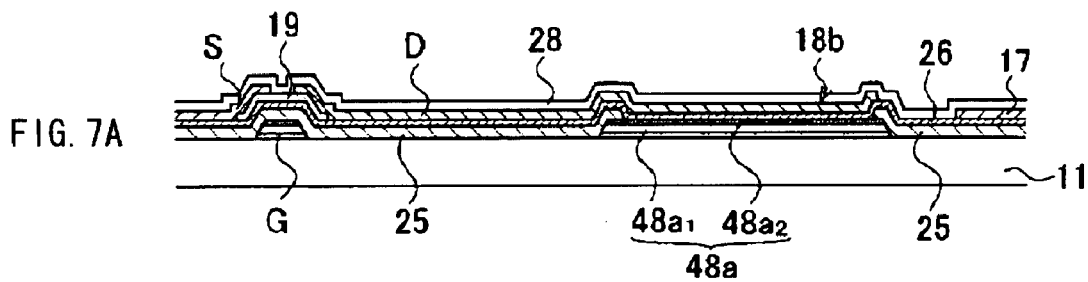
FIG. 7A
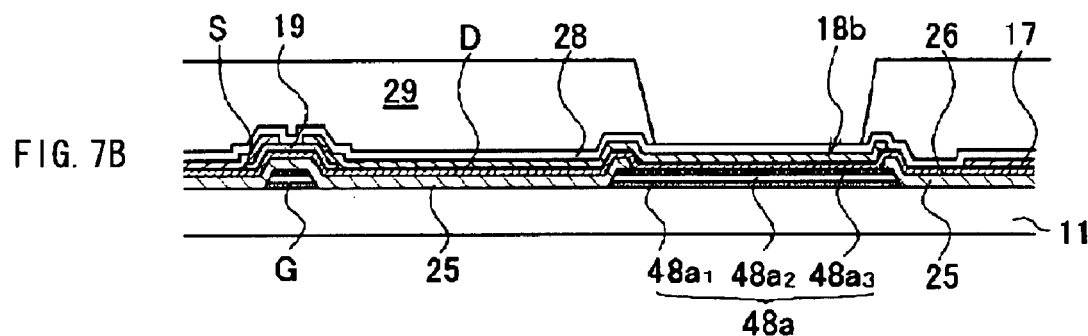
FIG. 7B
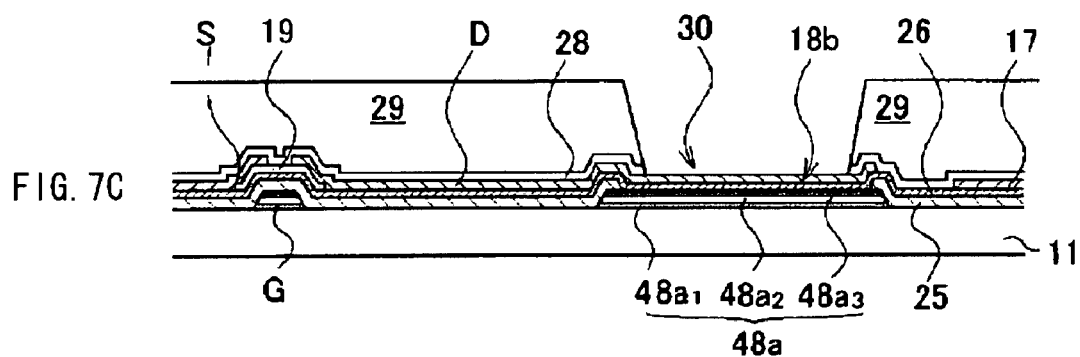
FIG. 7C
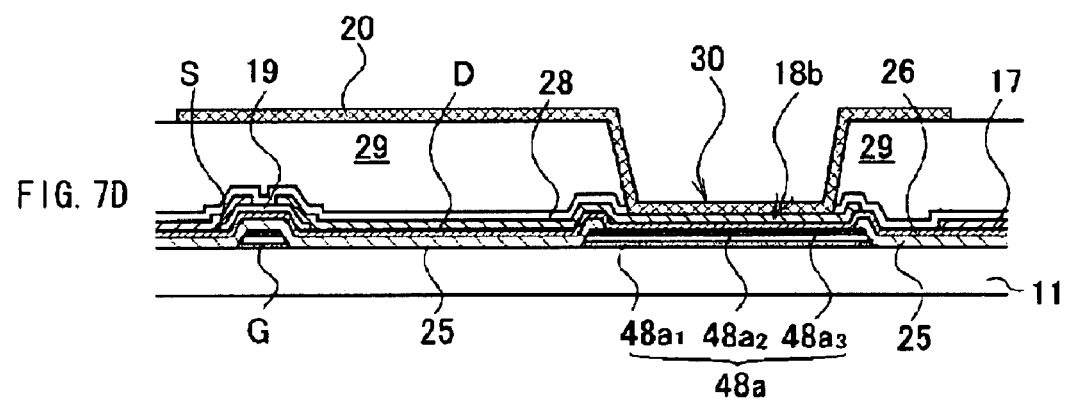
FIG. 7D FIG.8
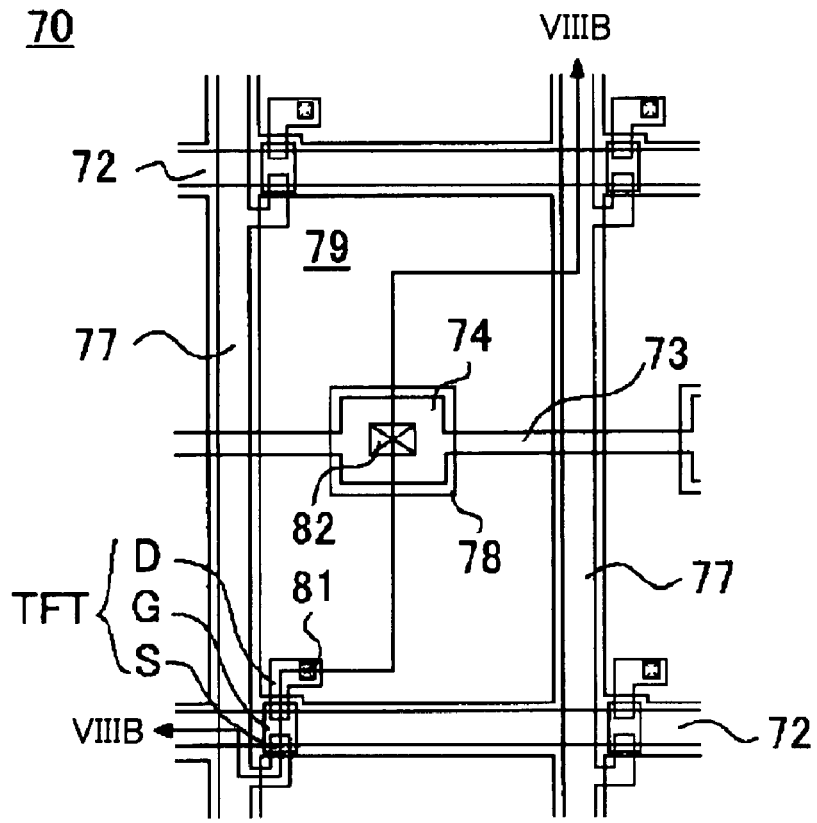
FIG. 8A
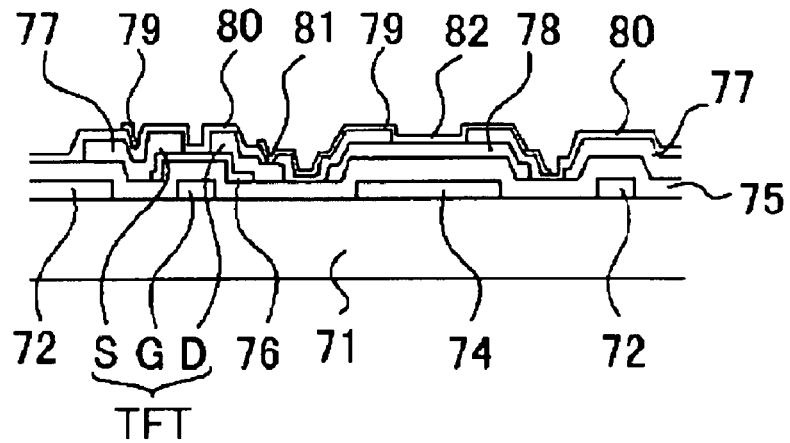
FIG. 8B FIG.10
FIG. 10A
FIG. 10B
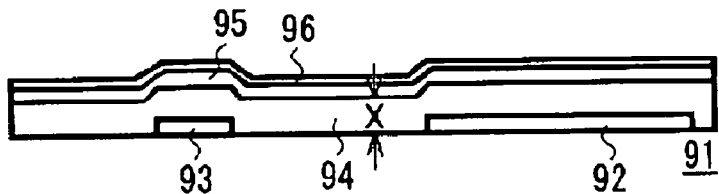
FIG. 10C
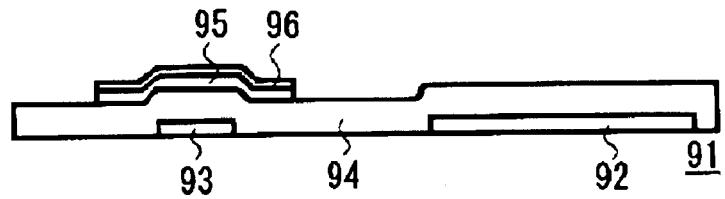
FIG. 10D
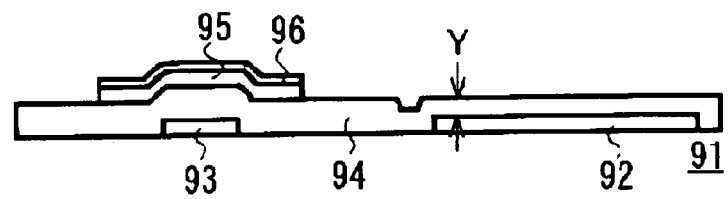
FIG. 10E
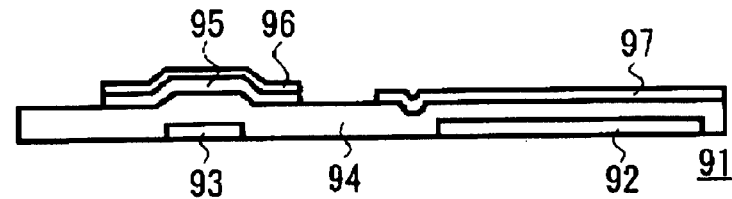
FIG. 10F
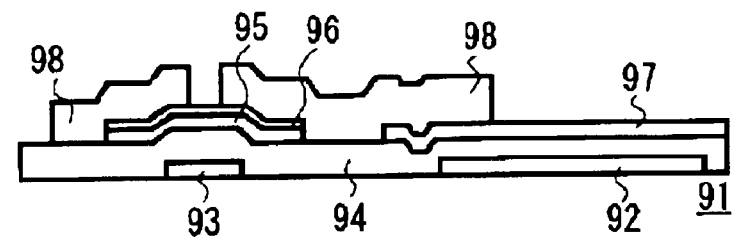
FIG. 10G
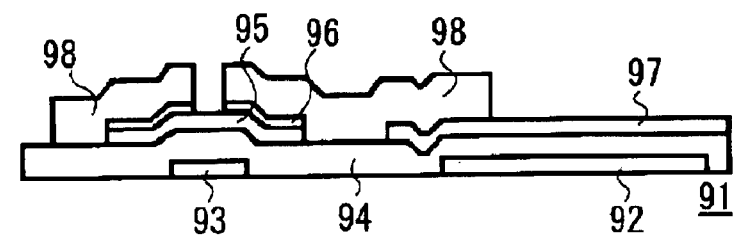

LIQUID CRYSTAL DISPLAY AND MANUFACTURING METHOD THEREFOR

BACKGROUND

1. Technical Field

The present invention relates to a liquid crystal display and a manufacturing method therefor. More particularly the invention relates to a liquid crystal display in which there are few short circuits in the regions where the auxiliary capacity is formed, so that the auxiliary capacity can be increased without reducing the aperture ratio of each pixel, and which is suitable for relatively small pixel area or high definition, and a manufacturing method therefor.

2. Related Art

Over recent years, liquid crystal displays have been much utilized not only in information and telecommunications equipment but in electrical equipment in general. A liquid crystal display is made up of a pair of substrates of glass or the like with electrodes, etc., formed on the surfaces, and a liquid crystal layer that is formed between the pair of substrates. Applying voltage to the electrodes on the substrates causes rearrangements of the liquid crystal molecules, which in turn cause variation of the light transmissivity, and by such means the device displays various images.

Structurally, such liquid crystal displays are composed of an array substrate and a color filter substrate, with liquid crystal being sealed between the two substrates. On the surface of the array substrate, scan lines and signal lines are formed as matrices, and in the areas enclosed by such wiring lines there are formed thin film transistors (TFTs) that serve as switching elements for driving the liquid crystal, display electrodes that apply voltage to the liquid crystal, and auxiliary capacity lines that form auxiliary capacity for holding the signals. On the surface of the color filter substrate there are formed red (R), green (G) and blue (B), etc., color filters, a common electrode, and so forth.

The auxiliary capacity lines that are formed on the array substrate are provided in order to form an auxiliary capacity that will hold for a certain period the electrical charge of the signals supplied from the signal wires. Generally, the auxiliary capacity is provided by forming a capacitor that uses as electrodes the auxiliary capacity lines and part of the TFT's drain electrode or pixel electrode, and as dielectric body the gate insulating film that covers the TFT's gate electrode. The auxiliary capacity lines are generally formed from a light-blocking conductive material such as aluminum, molybdenum or chromium.

Incidentally, from the viewpoint of preventing crosstalk or flicker in the liquid crystal display, the auxiliary capacity needs to be rendered large. But since the size of the individual pixels has decreased as liquid crystal displays have become increasingly more compact and high-definition with the technological innovations of recent years, it is difficult in actual practice, when the aperture ratios of the individual pixels are considered, to effect the increased thickness of the auxiliary capacity lines themselves that would be needed in order to render the auxiliary capacity large.

The above problem is resolved by the liquid crystal display array substrate 70 that is disclosed in JP-T-2005-506575. This will now be described using FIG. 8. FIG. 8A is a plan view of the array substrate, and FIG. 8B is a cross-section along VIIIB-VIIIB in FIG. 8A. The array substrate 70 of this liquid crystal display has a transparent insulating substrate 71, on which are formed: scan lines 72 constituted of aluminum, chromium, molybdenum, chromium nitride, molybdenum nitride or an alloy, etc., of these; auxiliary capacity lines 73; and a rectangular auxiliary capacity pattern 74. The scan lines 72 are coupled to the gate electrode G of the thin film transistor (TFT), and the rectangular auxiliary capacity pattern 74 is coupled to the auxiliary capacity line 73.

On the insulating substrate 71 there is a 2500 to 4500 Å thick gate insulating film 75 of silicon nitride, silicon oxide, or similar insulative substance, which covers the scan lines 72, auxiliary capacity lines 73 and the auxiliary capacity pattern 74. Over the gate insulating film 75 there is formed a semiconductor pattern 76 of amorphous silicon or similar, which lies over the gate electrode G. Over part of the semiconductor pattern 76 and the gate insulating film 75 there are formed a signal line 77 constituted of a conductive substance, and an auxiliary capacity-use conductive pattern 78. The signal line 77 extends in the longitudinal direction, and also serves as the source electrode S for the TFT.

The auxiliary capacity-use conductive pattern 78 is formed like an island in the same layer as the signal line 77, lies over the auxiliary capacity pattern 74 located under the interposed gate insulating film 75, and forms the auxiliary capacity together with the auxiliary capacity pattern 74. The auxiliary capacity-use conductive pattern 78 is electrically coupled to the pixel electrode 79 to be described later.

Such signal line 77, auxiliary capacity-use conductive pattern 78 and semiconductor pattern 76 are covered by a 2000 to 4500 Å thick protective insulating film 80 of silicon nitride, silicon oxide, or similar insulative substance. A contact hole 81 is formed in the protective insulating film 80, on top of the drain electrode D, and an opening 82 is provided on top of the auxiliary capacity-use conductive pattern 78. Further, a pixel electrode 79 is formed on the protective insulating film 80, the pixel electrode 79 and the drain electrode D are electrically coupled via the contact hole 81, and moreover the auxiliary capacity-use conductive pattern 78 and the pixel electrode 79 are connected via the opening 82, with the result that the auxiliary capacity-use conductive pattern 78 and the drain electrode D are electrically coupled via the pixel electrode 79. The pixel electrode 79 is formed from a transparent conductive substance such as ITO (indium tin oxide) or IZO (indium zinc oxide).

Thus, in the related art, the pixel electrode 79 overlaps the auxiliary capacity line 73 and the auxiliary capacity-use conductive pattern 78, and forms an auxiliary capacity together with the auxiliary capacity line 73, with the protective insulating film 80 and gate insulating film 75 being interposed therebetween. Further, although the pixel electrode 79 is electrically coupled to the auxiliary capacity-use conductive pattern 78, the auxiliary capacity-use conductive pattern 78 forms another auxiliary capacity that is separated off by the auxiliary capacity pattern 74 and gate insulating film 75. With this arrangement, the thickness of the gate insulating film 75 interposed between the auxiliary capacity-use conductive pattern 78 and auxiliary capacity pattern 74 is small, so that a larger capacitance can be assured compared with the case where the auxiliary capacity pattern 74 forms auxiliary capacity by overlapping with the pixel electrode 79, even though the superposition area is the same. Thus, in the liquid crystal display disclosed in JP-T-2005-506575, the capacitance is increased without enlarging the area of the auxiliary capacity pattern 74 and auxiliary capacity line 73, and as a result the capacitance to aperture ratio is improved.

However, in the array substrate 70 of the liquid crystal display disclosed in JP-T-2005-506575, the capacitance (auxiliary capacity) employs the auxiliary capacity-use conductive pattern 78 and auxiliary capacity pattern 74 as electrodes, and the gate insulating film 75 provided therebetween as dielectric body; the thickness of the gate insulating film 75, although made small, is nonetheless 2500 to 4500 Å, so that in order to assure auxiliary capacity that is adequate to curb display irregularities such as crosstalk and flicker, there is no alternative but to render large the area of the auxiliary capacity pattern 74, which is constituted of a light-blocking conductive substance. In other words, in the array substrate 70 of the liquid crystal display disclosed in JP-T-2005-506575, it would be possible to make the auxiliary capacity large by reducing the thickness of the gate insulating film 75, but if the gate insulating film 75 itself was made any thinner, it would become difficult to maintain the electrical insulation between the gate electrode G and scan line 72 covered by the gate insulating film 75 on the one hand, and the other members on the other hand.

The above problems are resolved by the array substrate of the liquid crystal display 90 disclosed in Japanese Patent No.-2584290, which will now be described using FIGS. 9 and 10. FIG. 9 is a plan view of several pixel portions of the array substrate disclosed in Japanese Patent No.-2584290, and FIGS. 10A to 10G are partial cross-sectional views illustrating in sequence the process of manufacturing the array substrate. First of all an auxiliary capacity line 92 of ITO (indium tin oxide) is pattern-formed over an insulating substrate 91 constituted of glass plate. Then a gate metallic film 93 is formed and patterned (FIG. 10A).

Next, by means of plasma CVD or similar, an insulating film 94 of $SiN_x$ or $SiO_x$, an amorphous semiconductor film 95 of for instance a-Si as an active layer, and an ohmic contact-use semiconductor film 96 constituted of for instance $n^+a$-Si film doped with impurities, are formed one after another (FIG. 10B). At this point, the thickness A of the insulating film is made sufficiently thick—for example X=4000 Å—to ensure that no short-circuiting will occur between the drain and gate or between the source and gate.

Next, the ohmic contact-use semiconductor film 96 and the amorphous semiconductor film 95 are etched into patterns with the same resist (FIG. 10C). Then the resist (not shown in FIG. 10), which remains as aperture patterns (dash-line portions in FIG. 9) at the portions where the auxiliary capacity line 92 will overlap a display-use transparent electrode 97 to be formed in the subsequent process, is coated, and by means of the etchant for the insulating film 94, such portions are etched to the requisite thickness Y=2000 Å to serve as the auxiliary capacity insulating film (FIG. 10D).

Next, a display-use transparent electrode 97 constituted of ITO is formed and patterned (FIG. 10E). Then a metallic film 98 for drain and source is also formed and patterned (FIG. 10F), and the ohmic contact-use semiconductor film 96 that is left on the TFT channel portion is etched away, whereupon the array substrate for the liquid crystal display is complete (FIG. 10G). The liquid crystal display 90 is then obtained by opposing to each other the array substrate structured as above and a common electrode substrate, with liquid crystal substance interposed therebetween.

In such related art technology, the auxiliary capacity line 92 and pixel electrode 97 are equivalent to the electrodes of a capacitor, and the insulating film 94 located between the auxiliary capacity line 92 and pixel electrode 97 is equivalent to the dielectric body of a capacitor. Because the thickness X of the insulating film 94 over the gate electrode 93 is 4000 Å, whereas the thickness Y of the insulating film over the auxiliary capacity line 92 is made to be 2000 Å, this technology has the advantages that short circuits are unlikely to occur between the drain and gate or the source and gate, and moreover that the required auxiliary capacity can be secured even if the area of the auxiliary capacity line 92 is not enlarged.

In the array substrate 90 of the liquid crystal display disclosed in Japanese Patent No.-2584290, the surface of the auxiliary capacity line is partially etched so that the gate insulating film portion alone is rendered thin. Thereby the auxiliary capacity is increased, with electrical insulation being maintained unchanged between the gate electrode and scan line covered by the gate insulating film on the one hand, and the other members on the other hand. However, it is difficult to control the etching amount so as to render the auxiliary capacity line's gate insulating film partially thin and obtain the desired thickness thereof. It is also problematic to maintain uniformity of the thickness of the auxiliary capacity line's gate insulating film in each liquid crystal display.

The present inventors found the following method for resolving the problem of film thickness uniformity with the structure and manufacturing method of the auxiliary capacity forming means disclosed in Japanese Patent No. 2584290. First, form an insulating film of a particular thickness over the auxiliary capacity line. After that, etch away the insulating film over the auxiliary capacity lower electrode, to produce an auxiliary capacity formation region in the auxiliary capacity line. Then form another insulating film with smaller thickness than the initially provided insulating film. In this way, an insulating film that is rendered thin and moreover is of uniform thickness can be formed over the auxiliary capacity lower electrode, with the particular thickness that is required for the gate insulating film being maintained. Nevertheless, with this method, short-circuiting was observed between the auxiliary capacity lower electrode and the auxiliary capacity upper electrode opposed thereto. It was therefore problematic to adopt the method immediately.

Also with JP-A-2001-13520, an insulating film of a particular thickness is formed over the auxiliary capacity lower electrode line, after which the insulating film at the auxiliary capacity lower electrode is etched away, and then another insulating film is formed. But it seems that also with JP-A-2001-13520, short-circuiting occurs between the auxiliary capacity lower electrode and the auxiliary capacity upper electrode opposed thereto.

SUMMARY

The inventors carried out a series of varied investigations into the cause of the above-described short-circuiting between the auxiliary capacity lower electrode and the auxiliary capacity upper electrode across the thin insulating film.

As a result, they found that the cause of the short-circuiting lies in the various high-temperature heat treatment processes in the manufacturing of the liquid crystal display.

Firstly, when aluminum is used for the auxiliary capacity line, stress may occur in the aluminum in the direction of compression during the various high-temperature heat treatment processes in the course of manufacture. Further, minute protrusions termed "hillocks" may arise on the surfaces of the aluminum due to such stress. In growing, these protrusions will break through the thin insulating film provided on the surface of the auxiliary capacity line, resulting directly in short-circuits between the auxiliary capacity line and auxiliary capacity upper electrode, or resulting in extreme lowering of the voltage resistance between the auxiliary capacity line and auxiliary capacity upper electrode, which will lead eventually to short-circuits.

Also, when aluminum or an aluminum alloy is used for the auxiliary capacity line, stress may occur in the aluminum or aluminum alloy in the direction of expansion during the various high-temperature heat treatment processes in the course of manufacture. Such stress may result in voids (depressions or hollows) occurring in the aluminum or aluminum alloy. Particularly if a depression such as that shown in FIG. 11 occurs in the surface of the aluminum or aluminum alloy, a depression that copies the shape of the depression in such surface will also occur in the insulating film provided over the surface of the auxiliary capacity lower electrode, since such insulating film is extremely thin. Because the auxiliary capacity upper electrode is formed on the surface of such insulating film, this will lead to short-circuiting at the depression portion, especially at the angled part.

The inventors arrived at the present invention when they discovered, while searching for ways to increase the auxiliary capacity of each pixel, that it is possible to drastically reduce short-circuiting between the auxiliary capacity lower electrode and the auxiliary capacity upper electrode by revising the structure and manufacturing method for the auxiliary capacity line so that after the insulating film is formed over the auxiliary capacity line, the portion of the insulating film at the auxiliary capacity lower electrode that will serve as the auxiliary capacity formation region is removed so as to form temporarily a window portion which is subsequently covered over.

An advantage of some aspects of the invention is to provide a liquid crystal display in which short-circuits at the auxiliary capacity formation region are few, a large auxiliary capacity is assured without any fall in the aperture ratio of each pixel, despite the pixels being small-area or high-definition, and display irregularities such as crosstalk or flicker can be curbed.

According to an aspect of the invention, a liquid crystal display includes: multiple signal lines and multiple scan lines deployed as matrices on a transparent substrate, pixel regions composed of areas delimited by the signal lines and scan lines, multiple auxiliary capacity lines provided parallel to the scan lines, each in an individual pixel region and equipped with an auxiliary capacity electrode portion, thin film transistors provided in each pixel region, and pixel electrodes that are electrically coupled to the drain electrodes of the thin film transistors. The liquid crystal display has the features that the auxiliary capacity electrode portions are formed with a layer of aluminum or aluminum alloy coated with a layer of molybdenum, a first insulating film coats the pixel regions except at least a part of the auxiliary capacity electrode portions, a second insulating film is coated onto the surface of the first insulating film, covering over the auxiliary capacity electrode portions, and auxiliary capacity upper electrodes are provided on the surface of the second insulating film at the auxiliary capacity electrode portions.

According to the foregoing liquid crystal display of the invention, the dielectric body layer for the auxiliary capacity is formed from the second insulating film, while the gate insulating film is formed from the first and second insulating films, so that the functioning of the gate insulating film is fully assured, and moreover a large auxiliary capacity can be assured without enlarging the auxiliary capacity area. Thus, a liquid crystal display is obtained in which the aperture ratio is improved and display irregularities such as crosstalk and flicker can be curbed.

More precisely: the gate insulating film was originally provided over the whole of the transparent substrate at a uniform thickness with the purpose of maintaining insulation between layers. It was thus particularly problematic to render the thickness of the gate insulating film smaller than the traditionally employed thickness in order to preserve the characteristics and performance of the TFTs above the gate electrodes. But by forming the second insulating film at the auxiliary capacity electrode portions of the auxiliary capacity line to be thinner than the combined thickness of both the first and second insulating films, which function as gate insulating films, it is possible to render into thin films just those portions of the insulating film that lie over the auxiliary capacity electrode portions, without reducing the thickness of the entire gate insulating film. In this way the auxiliary capacity can be assured without any adverse effects being exerted on the rest of the structure. As the material for forming the first and second insulating films, silicon nitride, silicon oxide, aluminum oxide or similar can be used. The films may both be of the same material, or may be of differing materials, but the second insulating film will preferably be of silicon nitride in the interest of insulation performance.

Also, the fact that the auxiliary capacity electrode portions are formed with a layer of aluminum or aluminum alloy coated with a layer of molybdenum means that despite various high-temperature heat treatments being implemented in the process of manufacturing the liquid crystal display, hillocks or voids will be unlikely to occur in the case of an aluminum layer, and voids will be particularly unlikely to occur in the case of an aluminum alloy layer. As a result, few short-circuits will occur between the auxiliary capacity lower and upper electrodes where the insulating film composing the auxiliary capacity is thin.

In the above liquid crystal display of the invention, the total thickness of the first insulating film and the second insulating film may be 2500 to 5500 Å, and the thickness of the second insulating film 500 to 1500 Å.

According to such a liquid crystal display of the invention, the combined thickness of the first and second insulating films, which function as the gate insulating films, will be 2500 to 5500 Å, and moreover the second insulating film, for auxiliary capacity, will be 500 to 1500 Å. Thus, degrees of thickness such as used in the related art, which will not impair the insulation, can be maintained for the first and second insulating films, which function as the gate insulating films, while at the same time the auxiliary capacity can be made large. The combined thickness of the first and second insulating films will more preferably be 2800 Å or higher, and the thickness of the second insulating film will more preferably be around 1000 Å.

Also, in the above liquid crystal display of the invention, the auxiliary capacity upper electrode may be formed by extending the drain electrode onto the second insulating film at the auxiliary capacity electrode portion.

According to the foregoing liquid crystal display of the invention, the auxiliary capacity upper electrode can be formed by extending the drain electrode, which means that there is no need to fabricate the auxiliary capacity upper electrode and drain electrode as separate items, and hence the auxiliary capacity upper electrode can be produced in a simple manner, without any increase in the manufacturing processes.

Also, in the above liquid crystal display of the invention, the auxiliary capacity electrode portions have a layer of silicon nitride or molybdenum, over which may be formed a layer of aluminum or aluminum alloy, which may be coated with a layer of molybdenum.

According to such a liquid crystal display of the invention, the silicon nitride or molybdenum layer formed at the bottom of the auxiliary capacity electrode portions plays the role of alleviating stress between those portions and the transparent substrate, and thereby curbs the thermal load that acts on the aluminum or aluminum alloy layer.

According to another aspect of the invention, a liquid crystal display includes: multiple signal lines and multiple scan lines deployed as matrices on a transparent substrate, pixel regions composed of areas delimited by the signal lines and scan lines, multiple auxiliary capacity lines provided parallel to the scan lines, each in an individual pixel region and equipped with an auxiliary capacity electrode portion, thin film transistors provided in each pixel region, and pixel electrodes that are electrically coupled to the drain electrodes of the thin film transistors. The liquid crystal display has the features that the auxiliary capacity electrode portions are formed with a layer of aluminum or aluminum alloy coated with a layer of molybdenum, the pixel region is coated with a first insulating film having window portions at the auxiliary capacity electrode portions, a second insulating film is coated onto the surface of the first insulating film, covering over the window portions, auxiliary capacity upper electrodes are provided on the surface of the second insulating film at the auxiliary capacity electrode portions, and the window portions are formed by removing portions of the first insulating film via plasma etching.

According to the foregoing liquid crystal display of the invention, the first insulating film's window portions formed at the auxiliary capacity electrode portions are formed by means of the plasma etching method. This means that, unlike the case where window portions are formed by reactive ion etching, it is possible to perform the etching with the molybdenum layer remaining. Thanks to this, the occurrence of hillocks or voids in the aluminum or aluminum alloy layer can be curbed.

According to a further aspect of the invention, a method for manufacturing a liquid crystal display that includes multiple signal lines and multiple scan lines deployed as matrices on a transparent substrate; pixel regions composed of areas delimited by the signal lines and scan lines; multiple auxiliary capacity lines provided parallel to the scan lines, each in an individual pixel region and equipped with an auxiliary capacity electrode portion; thin film transistors provided in each pixel region; and pixel electrodes that are electrically coupled to the drain electrodes of the thin film transistors. The method for manufacturing the liquid crystal display includes: a process that forms on the transparent substrate, by means of a layer of aluminum or aluminum alloy coated with a layer of molybdenum, the gate electrodes of the thin film transistors, the scan lines that couple with the gate electrodes, and the auxiliary capacity lines, a process that forms a first insulating film so as to cover the entire surface of the transparent substrate, a process that removes via plasma etching the first insulating film present at the auxiliary capacity electrode portions, a process that forms a second insulating film so as to cover the entire surface of the transparent substrate, a process that forms a semiconductor layer on the surface of the second insulating film so as to coat the upper portions of the gate electrodes, a process that forms on the surface of the second insulating film: source electrodes for the thin film transistors, signal lines that couple with the source electrodes, drain electrodes for the thin film transistors, and auxiliary capacity upper electrodes positioned over the auxiliary capacity electrode portions, and a process that forms a pixel electrode in each pixel region.

With the above liquid crystal display manufacturing method of the invention, the combined thickness of the first insulating film and the second insulating film may be 2500 to 5500 Å, and the thickness of the second insulating film 500 to 1500 Å.

Also, with the above liquid crystal display manufacturing method of the invention, the auxiliary capacity upper electrodes may be formed by extending the drain electrodes onto the second insulating film at the auxiliary capacity electrode portions.

According to the above liquid crystal display manufacturing method of the invention, a liquid crystal display that gives the aforementioned advantages can be manufactured with ease.

BRIEF DESCRIPTION OF THE DRAWINGS

The invention will be described with reference to the accompanying drawings, wherein like numbers reference like elements.

FIGS. 4A to 4D are cross-sectional views illustrating the processes subsequent to the formation of the auxiliary capacity upper electrode, in the manufacturing of the array substrate of FIG. 1.

FIG. 5A is a cross-sectional view illustrating the etching conditions when reactive ion etching is used, and FIG. 5B is a cross-sectional view illustrating the etching conditions when plasma etching is used.

FIGS. 7A to D give cross-sectional views illustrating the Second Embodiment processes subsequent to the formation of the auxiliary capacity upper electrode.

FIG. 8A is a plan view of a related art array substrate, and FIG. 8B is a cross-sectional view along VIIIB-VIIIB in FIG. 8A.

FIGS. 10A through G give cross-sectional views illustrating the process of manufacturing the array substrate in FIG. 9.

DESCRIPTION OF EXEMPLARY EMBODIMENTS

Exemplary embodiments of the invention will now be described with reference to the accompanying drawings. It should be borne in mind however that the following embodiments merely represent illustrative examples of a liquid crystal display and manufacturing method therefor that realize the technical concepts of the invention. These embodiments are not intended to limit the invention to this particular liquid crystal display and manufacturing method. The invention can equally well be applied in other embodiments contained within the scope of the claims.

First Embodiment

Figure 1:
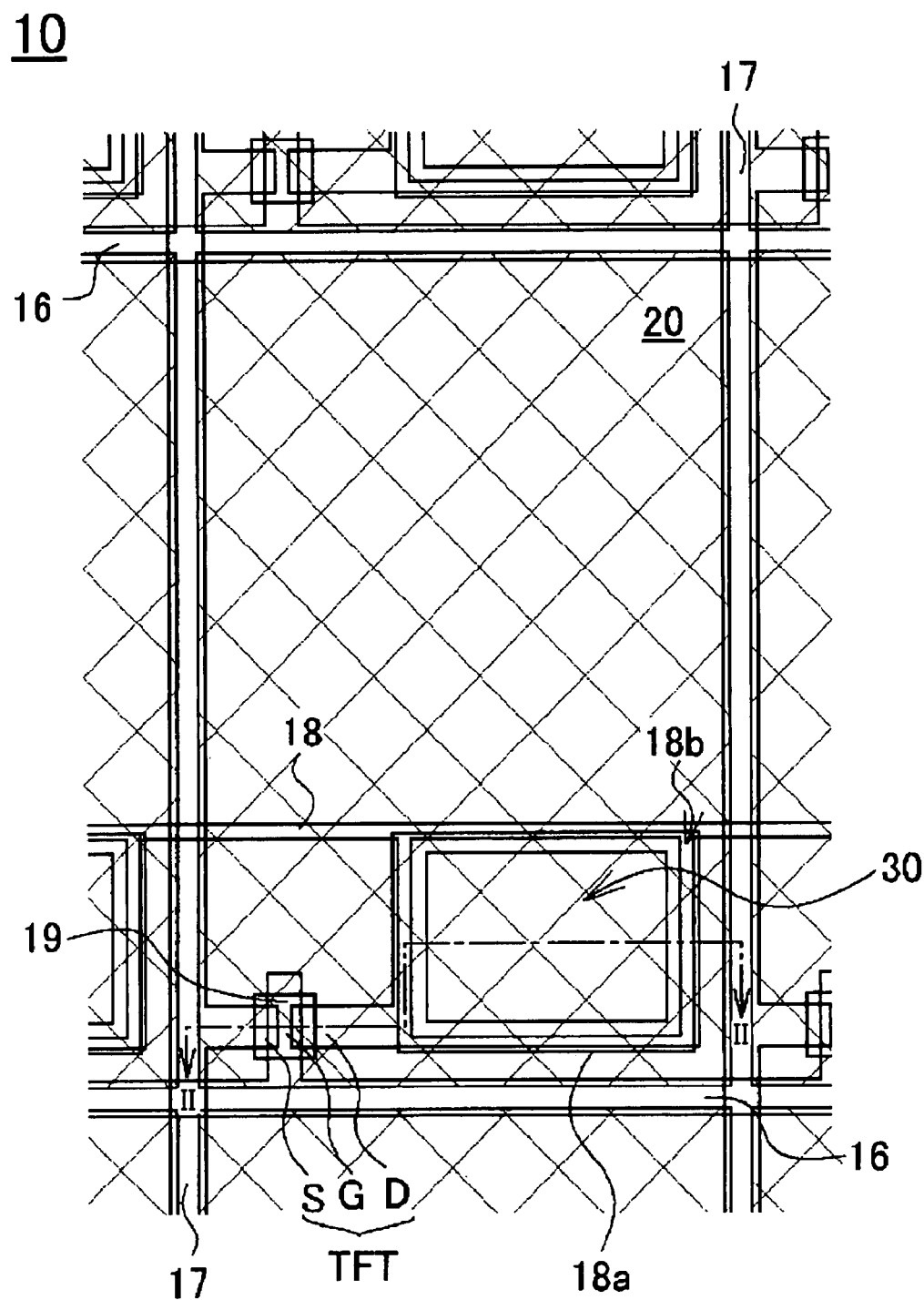
FIG. 1 is an enlarged plan view of a single pixel portion of the array substrate, seen through the color filter substrate, in the liquid crystal display of an embodiment of the invention.
Figure 2:
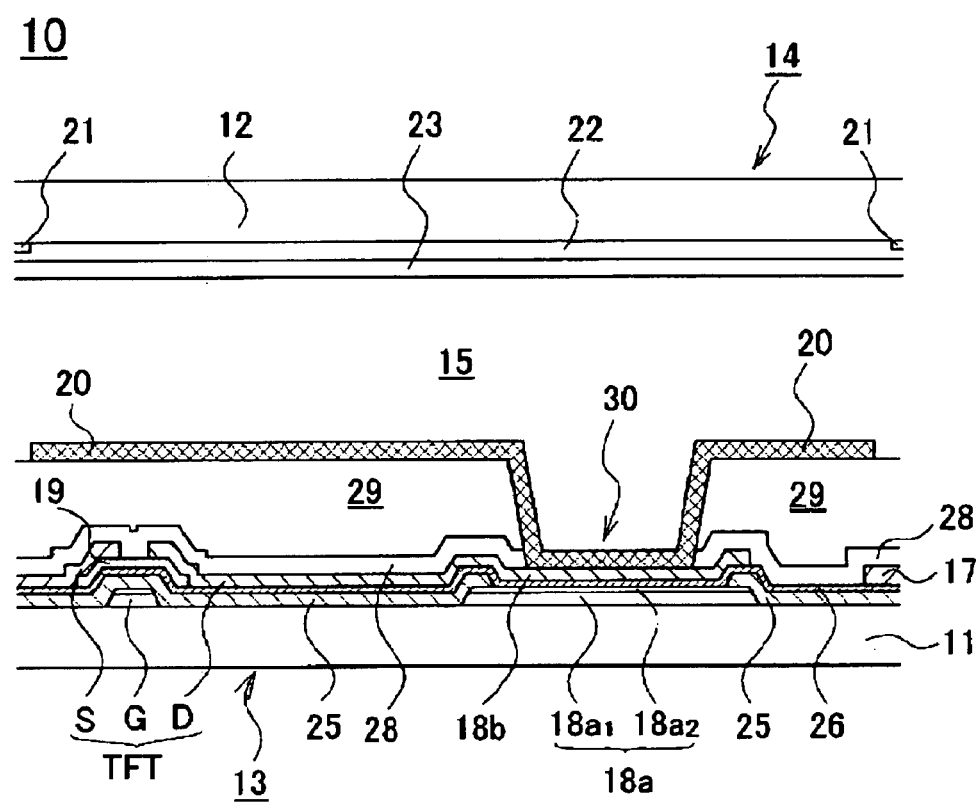
FIG. 2 is a cross-sectional view through II-II in FIG. 1.

FIG. 1 is an enlarged plan view of a portion corresponding to a single pixel of the array substrate, seen through the color filter substrate, in the liquid crystal display of a first embodiment of the invention. FIG. 2 is a cross-sectional view through II-II in FIG. 1. FIGS. 3A to 3F are cross-sectional views illustrating the processes in the manufacturing of the array substrate of FIG. 1, up to the formation of the auxiliary capacity upper electrode. Similarly, FIGS. 4A to 4D are cross-sectional views illustrating the processes subsequent to the formation of the auxiliary capacity upper electrode. All of FIGS. 3A to 3F and FIGS. 4A to 4D illustrate conditions at the position corresponding to the cross-section II-II in FIG. 1.

The liquid crystal display 10 of this embodiment is composed of a pair of substrates, namely an array substrate 13 plus a color filter substrate 14, and a liquid crystal layer 15. The array substrate 13 has a transparent substrate 11 of glass or similar, with various wiring lines, etc., formed thereon. The color filter substrate 14 has a transparent substrate 12 with color filters, etc., formed thereon. The liquid crystal layer 15 is sealed in the interior space that is produced when the array substrate 13 and color filter substrate 14 are stuck together by applying seal material (omitted in the drawings) at the outer edges thereof.

On the array substrate 13 there are provided scan lines 16, signal lines 17, an auxiliary capacity line 18, a TFT, and a pixel electrode 20. The multiple scan lines 16 and signal lines 17 are formed as matrices. The auxiliary capacity line 18 is provided parallel to the scan lines 16, between adjacent scan lines 16. The TFT is composed of a source electrode S, a gate electrode G, a drain electrode D, and a semiconductor layer 19. The pixel electrode 20 is provided so as to cover the pixel region enclosed by the scan lines 16 and signal lines 17. The pixel electrode 20 is constituted of a transparent conductive material consisting of ITO (indium tin oxide), IZO (indium zinc oxide) or the like. Amorphous silicon (a-Si) will normally be used for the TFT's semiconductor layer 19, but in some cases polysilicon (p-Si) may be used.

On the color filter substrate 14 there are provided black matrixes 21, a color filter 22, and a common electrode 23. The black matrixes 21 are provided in a matrix arrangement matching the pixel regions of the array substrate 13. The color filter 22 is composed of red (R), green (G) and blue (B), etc., color materials provided in the area enclosed by the black matrixes 21. The common electrode 23 is provided so as to cover the color filter 22. However, the invention is not limited to such structure. In the case of a transverse electrical field type display, the common electrode will be absent. And if the display is black-and-white, there will be no color filter. Further, in the case of a color display of the color complementation type, the color filter will be configured with more colors than the three primary colors.

Figure 3:
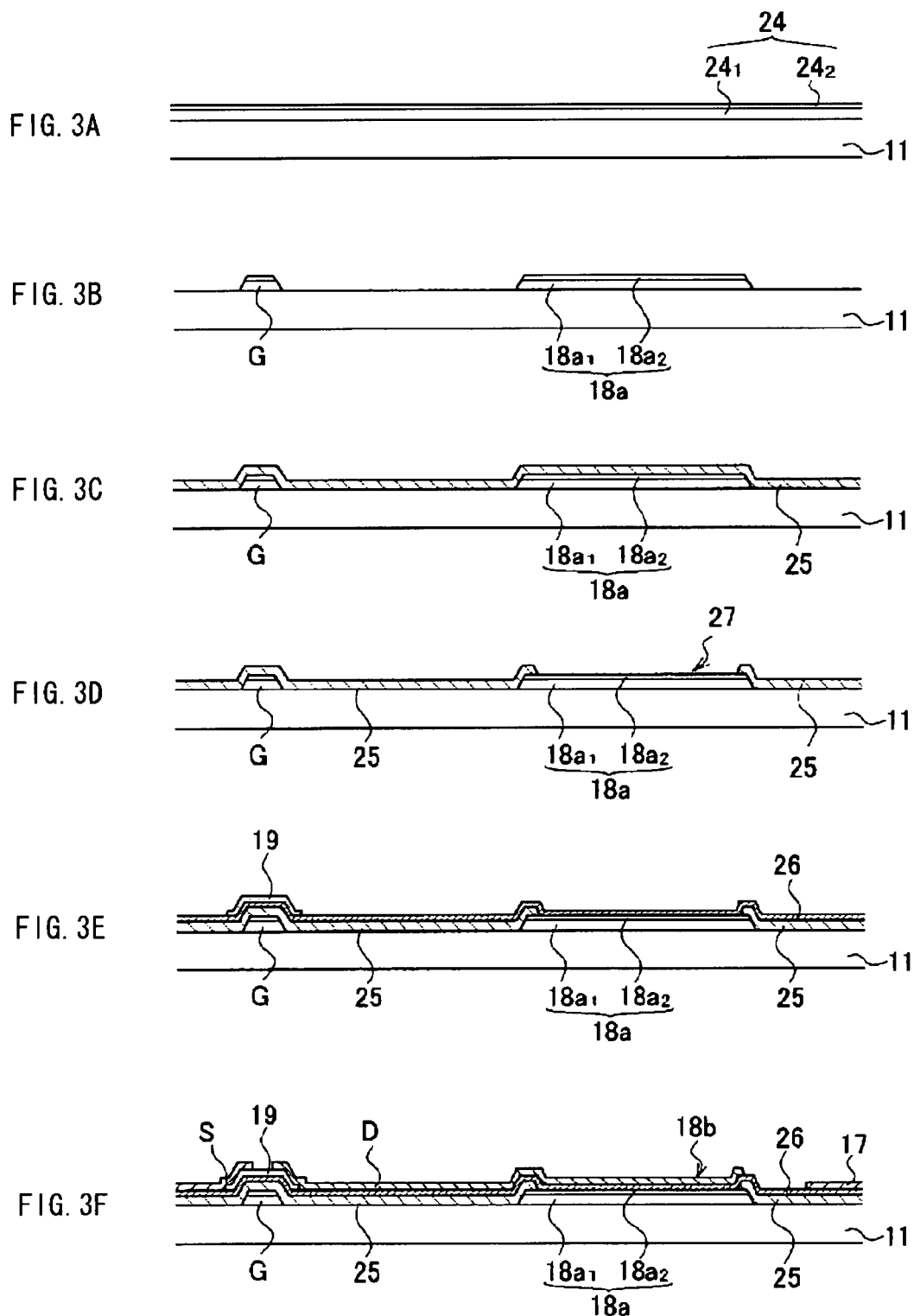
FIGS. 3A to 3F are cross-sectional views illustrating the processes in the manufacturing of the array substrate of FIG. 1, up to the formation of the auxiliary capacity upper electrode.

The manufacturing process for the liquid crystal display's array substrate 13 will next be described, with reference to FIGS. 3 and 4. First, as shown in FIG. 3A, a conductive substance layer 24 of a composite structure made up of an aluminum alloy layer $24_1$ of a particular thickness and a Molybdenum layer $24_2$ of a particular thickness is formed on the transparent substrate 11. For the aluminum alloy layer $24_1$, Al—Nd, Al—Ta or the like will be used. Especially with Al—Nd or Al—Ta, although voids will occur, hillocks will be unlikely to occur, so it will be good to use these as the aluminum alloy layer. Next, patterning is performed as shown in FIG. 3B, using a commonly-known photolithography method. Part of the conductive substance layer 24 is etched away by this patterning. Then are formed the multiple scan lines 16 extending in the crosswise direction, the gate electrodes G that couple to the scan lines 16, and an auxiliary capacity line 18 between each adjacent pair of the multiple scan lines 16. In FIG. 3 there are shown, in a single pixel region, the gate electrode G that extends from a scan line 16, and an auxiliary capacity lower electrode 18a that is formed as the auxiliary capacity electrode portion by widening a part of the auxiliary capacity line 18.

Next, the transparent substrate 11, on which the scan lines 16 and auxiliary capacity lines 18 have been formed in the preceding process, is heated inside a vacuum device to high temperature, for example 250 to 350° C., and on the surface thereof a first insulating film 25 of silicon nitride is formed with a particular thickness (for instance 3000 Å), as shown in FIG. 3C, via the plasma CVD (chemical vapor deposition) or like method, according to the ordinary procedure.

Following that, the first insulating film 25 that is present over the auxiliary capacity lower electrode 18a of each individual pixel region is removed by means of plasma etching, which is a form of dry etching. Through the removal of the first insulating film 25 over the auxiliary capacity lower electrodes 18a, window portions 27 are formed. It will be permissible for a part of the first insulating film 25 over the auxiliary capacity lower electrodes 18a to remain—for example, at the end periphery of the auxiliary capacity lower electrode 18a.

Besides plasma etching, reactive ion etching is another form of dry etching that is also well-known.

For the etching of insulating films, it is usual to employ reactive ion etching. This is because reactive ion etching is strongly anisotropic, which means that when the first insulating film 25 is etched, the resist lying thereover will also be gradually shaved away as the etching proceeds. As a result, a taper will be formed in the first insulating film 25, as shown in FIG. 5A. If this taper is such that the angle (indicated by the dash-line circle) formed by the top surface and side surface of the first insulating film 25 is obtuse, then even if a conductive film or similar is formed thereover, such angle will be unlikely to cause breaks to occur in the second insulating film 26 or auxiliary capacity upper electrode 18b over the window portion.

However, employing reactive ion etching results in removal not only of the first insulating film 25 but also of the molybdenum layer $18a_2$ at the window portion 27 during formation thereof, as shown in FIG. 5A. It is therefore not possible to employ reactive ion etching for liquid crystal displays such as those of the invention, which have a structure such that the first insulating film 25 over the auxiliary capacity lower electrode 18a is removed to form a window portion 27, then the window portion 27 is covered over with a second insulating film 26, and then the auxiliary capacity upper electrode 18b is formed thereover, in the interest of increased auxiliary capacity.

Accordingly, plasma etching is used. Plasma etching is isotropic, so that, as shown in FIG. 5B, the angle (indicated by the dash-line circle) formed by the top surface and side surface of the first insulating film 25 will be approximately a right angle. Hence if a conductive film or similar is formed thereover, breaks will be likely to occur in the conductive film due to such angle.

However, with liquid crystal displays such as those of the invention, which have a structure such that the first insulating film 25 over the auxiliary capacity lower electrode 18a is removed to form a window portion 27, then the window portion 27 is covered over with a second insulating film 26, and then the auxiliary capacity upper electrode 18b is formed thereover, in the interest of increased auxiliary capacity, the angle formed by the top surface and side surface of the first insulating film 25 is covered by the second insulating film 26 which is formed thereover. Further, the auxiliary capacity upper electrode 18b is formed over such location covered by the second insulating film 26, and as a result, it is unlikely that the angle formed by the top surface and side surface of the first insulating film 25 will cause breaks in the auxiliary capacity upper electrode 18b.

Moreover, when plasma etching is used, the molybdenum layer $18a_2$ will be left intact when the first insulating film 25 is removed. The intact molybdenum layer $18a_2$ will reduce the thermal load on the aluminum alloy layer $18a_1$ that is a constituent of the auxiliary capacity lower electrode 18a. As a result, the occurrence of voids (depressions and hollows) in the aluminum alloy layer $18a_1$ will be drastically reduced. Actually, the aluminum alloy layer $18a_1$ is less prone to hillocks (minute protrusions) than to voids, whereas this structure will have the effect of reducing the occurrence of hillocks. But if aluminum is used instead of the aluminum alloy layer $18a_1$, not only voids but hillocks also can be drastically reduced. Further, the molybdenum layer $18a_2$, if present, will cover any voids or hillocks that occur in the aluminum alloy layer $18a_1$.

Subsequently, as shown in FIG. 3E, the second insulating film 26 is formed over the entire surface of the transparent substrate 11 via plasma CVD or the like. The second insulating film 26 is constituted of silicon oxide of a particular thickness (for example 1000 Å) that is smaller than that of the first insulating film 25. Each pixel region is coated over by both the first insulating film 25 and the second insulating film 26, except for the auxiliary capacity lower electrode 18a areas. Also, in each pixel region, the auxiliary capacity lower electrode 18a areas are coated over by the second insulating film 26. Both the first insulating film 25 and the second insulating film 26 function as gate insulating films; the second insulating film 26 over the auxiliary capacity lower electrodes 18a also functions as a dielectric body for auxiliary capacity formation.

The combined thickness of the first insulating film 25 and the second insulating film 26 should amount to the 2500 to 5500 Å employed in the related art, in order to prevent dielectric breakdown due to static at the gate electrode G portions of the TFTs. The thickness of the second insulating film 26 will preferably be as thin as is possible without causing short-circuits, and should be determined at 500 to 1500 Å. A thickness below 500 Å for the second insulating film 26 would result in many short-circuits between the auxiliary capacity lower electrodes 18a and auxiliary capacity upper electrodes 18b, and therefore is not desirable. Also, a thickness exceeding 1500 Å is not desirable for the second insulating film 26, because a low auxiliary capacity would result.

Next, a semiconductor film constituted of for example an a-Si layer plus an n$^+$a-Si layer of particular thicknesses (for example 1300 Å for the a-Si layer and 300 Å for the n$^+$a-Si layer) is formed over the entire surface of the second insulating film 26. After that, the semiconductor film is removed via reactive ion etching in such a manner as to leave a semiconductor layer 19 on the surface of the second insulating film 26 over the TFTs' gate electrodes G.

Following that, patterning of the signal lines 17, source electrode S, drain electrode D and auxiliary capacity upper electrode 18b is performed, as shown in FIG. 1 and FIG. 3F. The multiple signal lines 17 extend in the direction orthogonal to the scan lines 16. The source electrode S is drawn out from a signal line 17 and couples with the semiconductor layer 19. The auxiliary capacity upper electrode 18b is positioned on the surface of the second insulating film 26 over the auxiliary capacity lower electrode 18a. The drain electrode D has one edge coupled to the semiconductor layer 19. In the example shown here, the auxiliary capacity upper electrode 18b and the drain electrode D are formed as an integrated whole. But the auxiliary capacity upper electrode 18b and the drain electrode D could alternatively be formed as separate items.

Further, a passivation film 28 is formed over the transparent substrate 11 in such a manner as to cover these various wiring lines, as shown in FIG. 4A. The passivation film 28 is constituted of an inorganic insulative material (such as silicon nitride) for surface stabilization. Following that, an interlayer insulating film 29 is formed in order to flatten the surface of the array substrate 13, as shown in FIG. 4B. In order to form, during the next process, a contact hole 30 in the passivation film 28 at the portion positioned over the auxiliary capacity upper electrode 18b, the interlayer insulating film 29 at the place corresponding to the contact hole 30 is removed. The interlayer insulating film 29 is constituted of polyimide or other organic insulating material.

After that, the contact hole 30 is formed, by etching, in the passivation film 28 located over the auxiliary capacity upper electrode 18b, as shown in FIG. 14C. The position where the contact hole 30 is formed is not limited to that over the auxiliary capacity upper electrode 18b. However, when the array substrate 13 is stuck to the color filter substrate 14 to form the liquid crystal display 10, the distance between those substrates, that is, the cell gap, at the part where the contact hole 30 is formed will be different from that at the other parts, and because of this there is a risk that unevenness could occur in the display quality. Therefore it is preferable to provide the contact hole 30 over the auxiliary capacity upper electrode 18b, which is constituted of a light-blocking material. With such a configuration, there will be no reduction of the aperture ratio, since the contact hole 30 will be provided over the auxiliary capacity upper electrode 18b, which in any case makes no contribution to the aperture ratio.

Finally, a pixel electrode 20 constituted of ITO or the like is formed in each pixel region enclosed by the scan lines 16 and signal lines 17, as shown in FIG. 4D. Preferably, in order to prevent light leakage, parts of the pixel electrodes 20 will be positioned over the scan lines 16 and signal lines 17, and adjacent pixel electrodes 20 will be provided so as not to be in contact with each other. With the above process, manufacture of the array substrate 13 is complete.

For the auxiliary capacity of the array substrate 13 formed via the foregoing manufacturing processes, the auxiliary capacity lower electrodes 18a and auxiliary capacity upper electrodes 18b of the auxiliary capacity lines 18 are equivalent to the electrodes of a capacitor, and the second insulating film 26 deposed between the auxiliary capacity lower electrodes 18a and auxiliary capacity upper electrodes 18b is equivalent to the dielectric body of a capacitor. Moreover, the thickness of the dielectric body constituted by the second insulating film 26 can be made drastically smaller—500 to 1500 Å—than the 2500 to 4500 Å thickness of the gate insulating film employed in the related art. Thus, the auxiliary capacity can be dramatically increased without enlarging the area of the auxiliary capacity lower electrodes 18a of the auxiliary capacity lines 18. Because the gate electrode G and scan lines 16 are covered by a gate insulating film constituted by the stacked first and second insulating films 25, 26, insulation performance and resistance to dielectric breakdown are adequately assured.

As described above, according to a liquid crystal display of the invention, the auxiliary capacity can be drastically increased without enlarging the area of the auxiliary capacity lower electrodes 18a of the auxiliary capacity lines 18, which are constituted of light-blocking material. Hence, it is possible to curb display irregularities such as crosstalk and flicker without lowering the aperture ratios of the individual pixels. Also, the liquid crystal display has a structure such that, in order to increase the auxiliary capacity, the first insulating film 25 over the auxiliary capacity lower electrodes 18a is removed to form window portions 27, then the window portions 27 are covered over with a second insulating film 26, and then the auxiliary capacity upper electrodes 18b are formed thereover, by means of which the occurrence of short-circuits between the auxiliary capacity lower electrodes 18a and auxiliary capacity upper electrodes 18b can be drastically reduced.

With the invention, a liquid crystal display can be rendered semitransmissive or reflective type by providing reflecting plates of a light-reflecting material between the pixel electrodes 20 and the interlayer insulating layer 29, or on the surfaces of the pixel electrodes 20. More precisely, to obtain a semitransmissive liquid crystal display, it will suffice to provide reflecting plates at the areas where the TFTs and the auxiliary capacity formation regions 18a of the auxiliary capacity lines 18 overlap viewed from above, and to obtain a reflective liquid crystal display, it will suffice to provide reflecting plates at the areas of overlap with the pixel electrodes. It will be preferable to form minute concavo-convexities on the surface of the interlayer insulating layer 29 where the reflecting plates are provided, since the view angle of the reflective portion will be wider as a result.

The foregoing embodiment illustrates an example in which both the first and the second insulating films 25, 26 are constituted of silicon nitride. But both could alternatively be constituted of silicon oxide or aluminum oxide. Further, it is also possible to use silicon oxide for either the first insulating film 25 or the second insulating film 26, and use silicon nitride for the other. But in the interest of insulation, silicon nitride will be preferable for the second insulating film 26.

Second Embodiment

Another embodiment of the invention will now be described. FIGS. 6A to 6F are cross-sectional views illustrating the process of manufacturing the array substrate of the Second Embodiment, up to the formation of the auxiliary capacity upper electrode. Similarly, FIGS. 7A to 7D are cross-sectional views illustrating the processes subsequent to the formation of the auxiliary capacity upper electrode. All of FIGS. 6A to 6F and FIGS. 7A to 7D illustrate conditions at the position corresponding to the cross-section II-II in FIG. 1. Items that are the same as in the First Embodiment are assigned the identical reference numerals, and detailed descriptions thereof are omitted.

Figure 6:
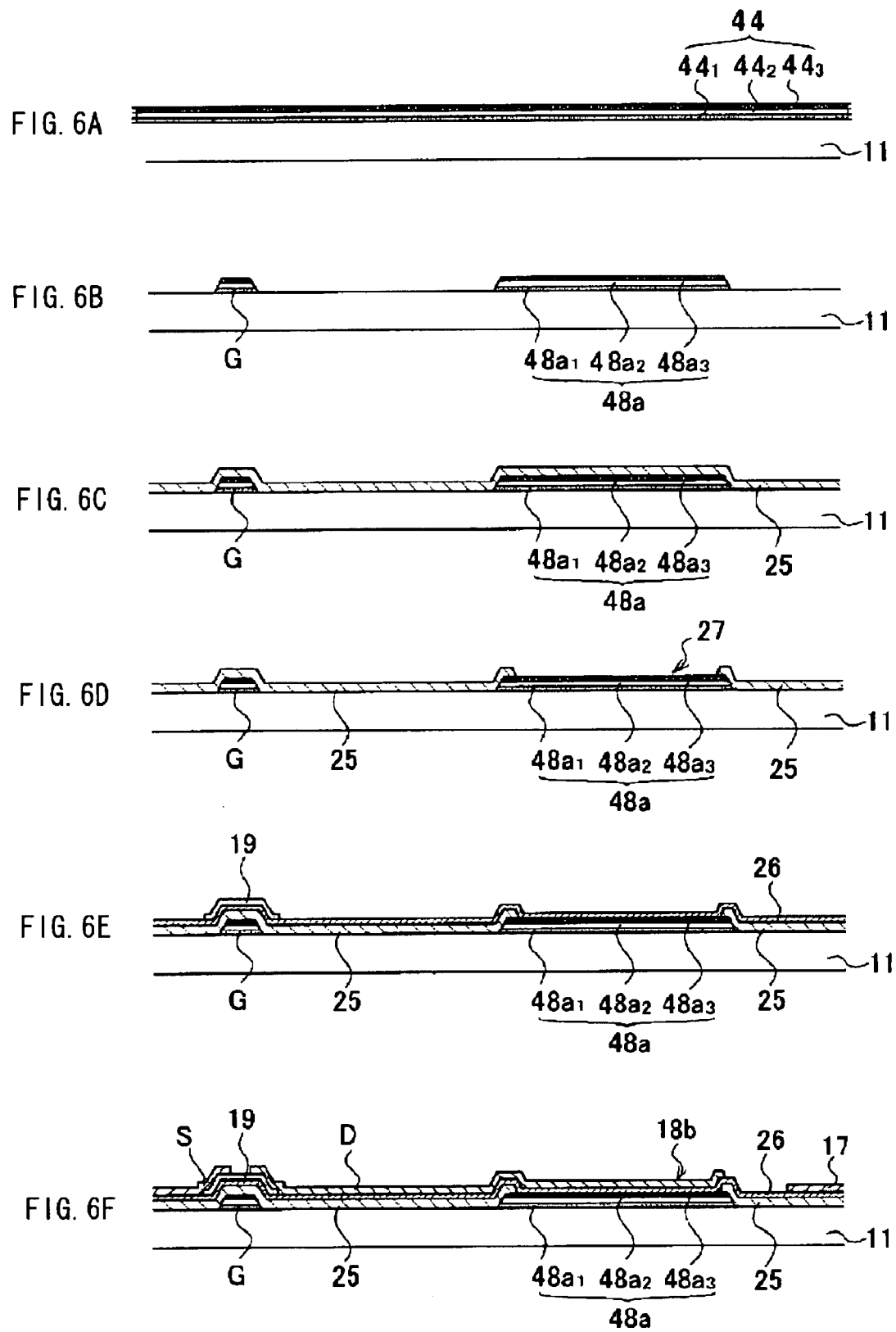
FIGS. 6A to F give cross-sectional views illustrating the processes of the Second Embodiment, up to the formation of the auxiliary capacity upper electrode.
Figure 9:
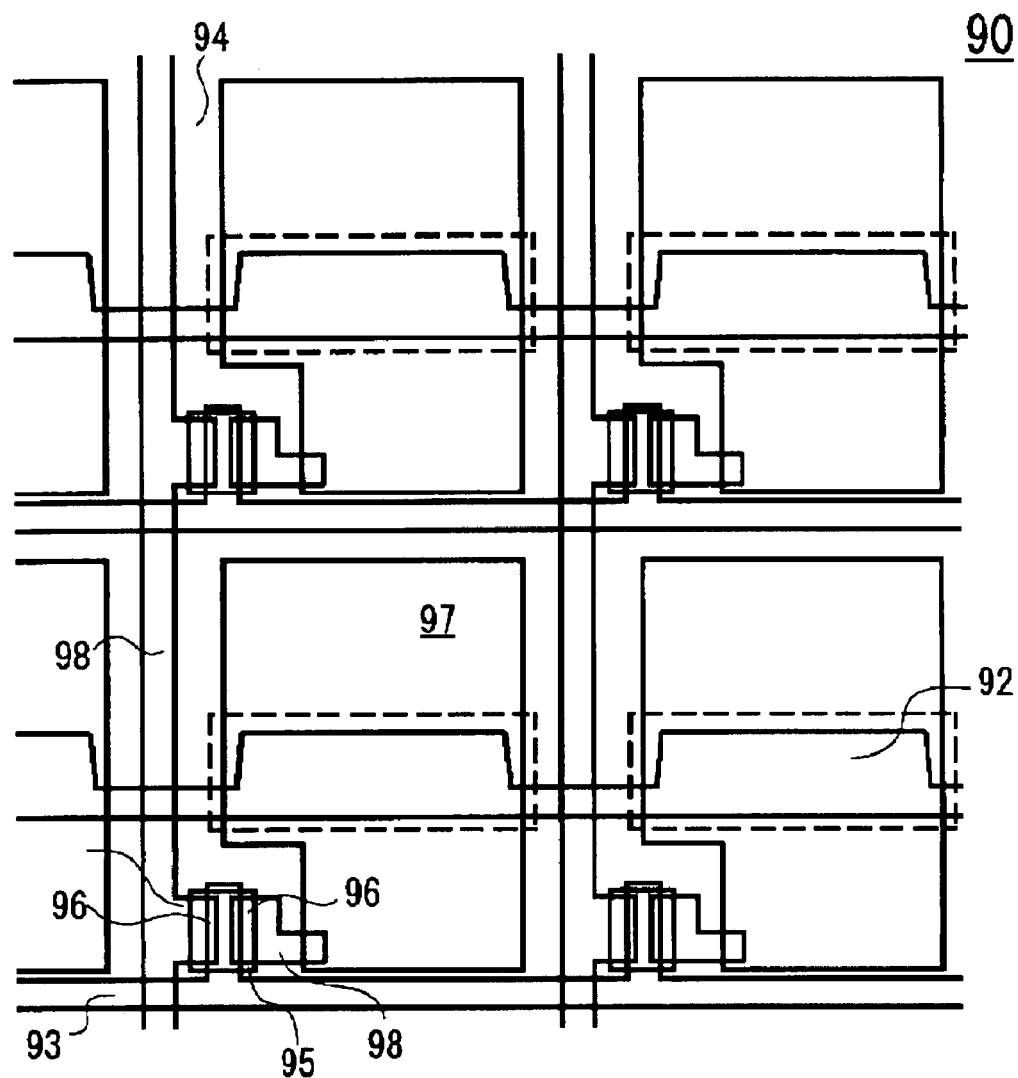
FIG. 9 is a plan view of another related art array substrate.
Figure 11:
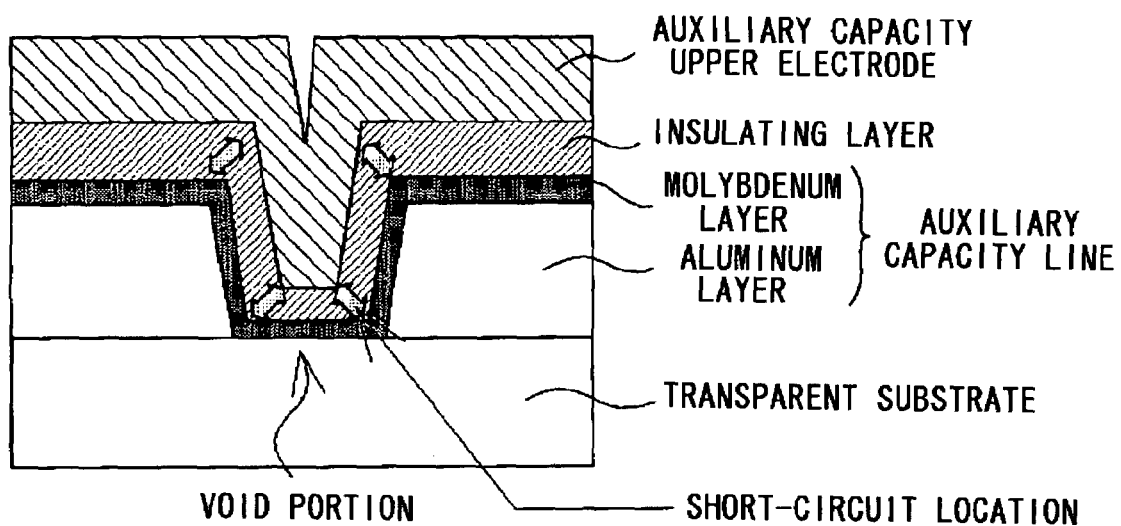
FIG. 11 is a schematic cross-sectional view illustrating the state where a depression has occurred in the aluminum or aluminum alloy layer.

First, as shown in FIG. 6A, a conductive substance layer 44 with a 3-layer structure consisting of, for example, a silicon nitride layer $44_1$, an aluminum alloy layer $44_2$ and a molybdenum layer $44_3$, is formed on the transparent substrate 11. Next, patterning is performed as shown in FIG. 6B, using a commonly-known photolithography method. Part of the conductive substance layer 44 is etched away by this patterning. Then are formed the multiple scan lines 16 extending in the crosswise direction, the gate electrodes G that couple to the scan lines 16, and an auxiliary capacity line 18 between each adjacent pair of the multiple scan lines 16. In FIG. 6B there are shown, in a single pixel region, the gate electrode G that extends from a scan line 16, and an auxiliary capacity lower electrode 48a that has a 3-layer structure consisting of a stress alleviating layer $48a_1$ of silicon nitride, an aluminum alloy layer $48a_2$ and a molybdenum layer $48a_3$, and that is formed by widening a part of the auxiliary capacity line 18. The stress alleviating layer $48a_1$ could alternatively be formed of a molybdenum layer. Further, this stress alleviating layer $48a_1$ will curb the thermal load that acts on the aluminum alloy layer $48a_2$ and molybdenum layer $48a_3$ during the various high-temperature heat treatments in the manufacturing process. The compressive stress that occurs in the aluminum alloy layer $48a_2$ and molybdenum layer $48a_3$, will be alleviated by the stress alleviating layer $48a_1$, which is provided as the layer below the aluminum alloy layer $48a_2$ and molybdenum layer $48a_3$, with the result that voids will be unlikely to occur in the aluminum alloy layer $48a_2$.

Next, the transparent substrate 11, on which the scan lines 16 and auxiliary capacity lines 18 have been formed in the preceding process, is heated inside a vacuum device to high temperature, for example 250 to 350° C., and on the surface thereof a first insulating film 25 of silicon nitride is formed with a particular thickness (for instance 3000 Å), as shown in FIG. 6C, via the plasma CVD (chemical vapor deposition) or like method, according to the ordinary procedure.

Following that, the first insulating film 25 that is present over the auxiliary capacity lower electrode 48a of each individual pixel region is removed by means of plasma etching. Through the removal of the first insulating film 25 over the auxiliary capacity lower electrodes 48a, window portions 27 are formed. The reason for this is the same as the reason stated for the First Embodiment.

After that, as shown in FIG. 6E, the second insulating film 26 is formed over the entire surface of the transparent substrate 11 via plasma CVD or the like. The second insulating film 26 is constituted of silicon oxide of a particular thickness (for example 1000 Å) that is smaller than that of the first insulating film 25. Each pixel region is coated over by both the first insulating film 25 and the second insulating film 26, except for the auxiliary capacity lower electrode 48a areas. Also, in each pixel region, the auxiliary capacity lower electrode 48a areas are coated over by the second insulating film 26. Both the first insulating film 25 and the second insulating film 26 function as gate insulating films; the second insulating film 26 over the auxiliary capacity lower electrodes 48a also functions as a dielectric body for auxiliary capacity formation.

The combined thickness of the first insulating film 25 and the second insulating film 26 should amount to the 2500 to 5500 Å employed in the related art, in order to prevent dielectric breakdown due to static at the gate electrode G portions of the TFTs. The thickness of the second insulating film 26 will preferably be as thin as is possible without causing short-circuits, and should be determined at 500 to 1500 Å. A thickness below 500 Å for the second insulating film 26 would result in many short-circuits between the auxiliary capacity lower electrodes 48a and auxiliary capacity upper electrodes 18b, and therefore is not desirable. Neither is a thickness exceeding 1500 Å desirable for the second insulating film 26, because a low auxiliary capacity would result.

Further, a semiconductor film constituted of for example an a-Si layer plus an n⁺a-Si layer of particular thicknesses (for example 1300 Å for the a-Si layer and 300 Å for the n⁺a-Si layer) is formed over the entire surface of the second insulating film 26. After that, the semiconductor film is removed via reactive ion etching in such a manner as to leave a semiconductor layer 19 on the surface of the second insulating film 26 over the TFTs' gate electrodes G.

Following that, a conductive substance layer of a composite structure made up of an aluminum alloy layer and a molybdenum layer is formed on the transparent substrate 11, and then patterning of the signal lines 17, source electrode S, drain electrode D and auxiliary capacity upper electrode 18b is performed, as shown in FIG. 6F. The multiple signal lines 17 extend in the direction orthogonal to the scan lines 16. The source electrode S is drawn out from a signal line 17 and couples with the semiconductor layer 19. The auxiliary capacity upper electrode 18b is positioned on the surface of the second insulating film 26 over the auxiliary capacity lower electrode 48a. The drain electrode D has one edge coupled to the semiconductor layer 19. In the example shown here, the auxiliary capacity upper electrode 18b and the drain electrode D are formed as an integrated whole. But the auxiliary capacity upper electrode 18b and the drain electrode D could alternatively be formed as separate items.

Further, a passivation film 28 is formed over the transparent substrate 11 in such a manner as to cover these various wiring lines, as shown in FIG. 7A. The passivation film 28 is constituted of a inorganic insulative material (such as silicon nitride) for surface stabilization. Following that, an interlayer insulating film 29 is formed in order to flatten the surface of the array substrate 13, as shown in FIG. 7B. The interlayer insulating film 29 is constituted of polyimide or other organic insulating material. After that, a contact hole 30 is formed, by etching, in the passivation film 28 located over the auxiliary capacity upper electrode 48b, as shown in FIG. 7C. The position where the contact hole 30 is formed is not limited to that over the auxiliary capacity upper electrode 48b. However, when the array substrate 13 is stuck to the color filter substrate 14 to form the liquid crystal display 10, the distance between those substrates, that is, the cell gap, at the part where the contact hole 30 is formed will be different from that at the other parts, and because of this there is a risk that unevenness could occur in the display quality. Therefore it is preferable to provide the contact hole 30 over the auxiliary capacity upper electrode 48b, which is of a light-blocking material. With such a configuration, there will be no reduction of the aperture ratio, since the contact hole 30 will be provided over the auxiliary capacity upper electrode 18b, which in any case makes no contribution to the aperture ratio.

Finally, a pixel electrode 20 constituted of ITO or the like is formed in each pixel region enclosed by the scan lines 16 and signal lines 17, as shown in FIG. 7D. Preferably, in order to prevent light leakage, parts of the pixel electrodes 20 will be positioned over the scan lines 16 and signal lines 17, and adjacent pixel electrodes 20 will be provided so as not to be in contact with each other. With the above process, manufacture of the array substrate 13 is complete.

For the auxiliary capacity of the array substrate 13 formed via the foregoing manufacturing processes, the auxiliary capacity lower electrodes 48a and auxiliary capacity upper electrodes 18b of the auxiliary capacity lines 18 are equivalent to the electrodes of a capacitor, and the second insulating film 26 deposed between the auxiliary capacity lower electrodes 48a and auxiliary capacity upper electrodes 18b is equivalent to the dielectric body of a capacitor. Moreover, the thickness of the dielectric body constituted by the second insulating film 26 can be made drastically smaller—500 to 1500 Å—than the 2500 to 4500 Å thickness of the gate insulating film employed in the related art. Thus, the auxiliary capacity can be dramatically increased without enlarging the area of the auxiliary capacity lower electrodes 48a. Because the gate electrode G and scan lines 16 are covered by a gate insulating film constituted by the stacked first and second insulating films 25, 26, insulation performance and resistance to dielectric breakdown are adequately assured.

Also, thanks to the molybdenum layer $48a_3$ provided on the surface of the aluminum alloy layer $48a_2$, and furthermore to the stress alleviation layer $48a_1$ present between the aluminum alloy layer $48a_2$ and the transparent substrate 11, the thermal load and thermal stress acting on the aluminum alloy layer $48a_2$ are curbed. As a result, voids are unlikely to occur in the aluminum alloy layer $48a_2$, and moreover hillocks will also be unlikely to occur. This means that short-circuiting between the auxiliary capacity lower electrodes 48a and auxiliary capacity upper electrodes 18b will be curbed, so that a high-reliability liquid crystal display 10 is obtained.

This embodiment illustrates an example where items composed of a stress alleviation layer $48a_1$ of silicon nitride plus an aluminum alloy layer $48a_2$ plus a molybdenum layer $48a_3$ are used for the scan lines 16 and gate electrodes G or auxiliary capacity lines 18. However, since the silicon nitride layer used for the stress alleviation layer $48a_1$ is a good insulator, there is no particular need to form patterns for the scan lines 16 and gate electrodes G or auxiliary capacity lines 18. Instead, the stress alleviation layer $48a_1$ could be provided over the entire surface of the transparent substrate 11. In the case where the silicone nitride layer $48_1$ is formed with a molybdenum layer however, it will be necessary to form patterns for the scan lines 16 and gate electrodes G or auxiliary capacity lines 18, because the molybdenum layer will be conductive. As for the aluminum alloy layer $48a_2$, the invention is not necessarily limited to this; the commonly used aluminum layer could be employed instead for the scan lines and auxiliary capacity lines, or a different aluminum alloy layer could be employed.

As described above, according to a liquid crystal display 10 of the invention, short-circuiting between the auxiliary capacity lines 18 and the auxiliary capacity upper electrodes 18b is curbed, while at the same time the auxiliary capacity can be drastically increased without enlarging the area of the auxiliary capacity lower electrodes 48a, which are constituted of light-blocking material. Hence, it is possible to curb display irregularities such as crosstalk and flicker without lowering the aperture ratios of the individual pixels.

What is claimed is:

1. A method for manufacturing a liquid crystal display that includes:
    multiple signal lines and multiple scan lines deployed as matrices on a transparent substrate;
    pixel regions composed of areas delimited by the signal lines and scan lines;
    multiple auxiliary capacity lines provided parallel to the scan lines, each in an individual pixel region and equipped with an auxiliary capacity electrode portion;
    thin film transistors provided in each pixel region; and
    pixel electrodes that are electrically coupled to the drain electrodes of the thin film transistors;
    the method comprising:
    forming on the transparent substrate, by means of a layer of aluminum or aluminum alloy coated with a layer of molybdenum, the gate electrodes of the thin film transistors, the scan lines that couple with the gate electrodes, and the auxiliary capacity lines;
    forming a first insulating film so as to cover the entire surface of the transparent substrate;
    removing via plasma etching the first insulating film present at the auxiliary capacity electrode portions;
    forming a second insulating film so as to cover the entire surface of the transparent substrate;
    forming a semiconductor layer on the surface of the second insulating film so as to coat the upper portions of the gate electrodes;
    forming on the surface of the second insulating film: source electrodes for the thin film transistors, signal lines that couple with the source electrodes, drain electrodes for the thin film transistors, and auxiliary capacity upper electrodes positioned over the auxiliary capacity electrode portions; and
    forming a pixel electrode in each pixel region.

2. The liquid crystal display manufacturing method according to claim 1, wherein the combined thickness of the first insulating film and the second insulating film is determined at 2500 to 5500 Å, and the thickness of the second insulating film at 500 to 1500 Å.

3. The liquid crystal display manufacturing method according to claim 1, wherein the auxiliary capacity upper electrodes are formed by extending the drain electrodes of the thin film transistor onto the second insulating film at the auxiliary capacity electrode portions.

* * * * *